United States Patent
Lecerf

(10) Patent No.: US 8,564,457 B2
(45) Date of Patent: Oct. 22, 2013

(54) METHOD AND A SYSTEM FOR CHARACTERIZING AND COUNTING VIOLATIONS OF A THRESHOLD BY AN AIRCRAFT ENGINE OPERATING PARAMETER

(75) Inventor: Nicolas Lecerf, Montgeron (FR)

(73) Assignee: SNECMA Services, Paris (FR)

(*) Notice: Subject to any disclaimer, the term of this patent is extended or adjusted under 35 U.S.C. 154(b) by 1309 days.

(21) Appl. No.: 12/338,146

(22) Filed: Dec. 18, 2008

(65) Prior Publication Data

US 2009/0164057 A1 Jun. 25, 2009

(30) Foreign Application Priority Data

Dec. 21, 2007 (FR) ...................... 07 60245

(51) Int. Cl.
*G08B 21/00* (2006.01)
(52) U.S. Cl.
USPC .............. 340/945; 701/14; 701/29.1; 701/99; 701/100
(58) Field of Classification Search
USPC ............. 701/14, 29.1, 99, 100; 340/945, 439; 60/778; 702/34
See application file for complete search history.

(56) References Cited

U.S. PATENT DOCUMENTS 6,650,972 B1 * 11/2003 Robinson et al. ................. 701/3
7,203,577 B2 * 4/2007 Gunn et al. ....................... 701/3

FOREIGN PATENT DOCUMENTS

| EP | 0 971 321 A2 | 1/2000 |
| EP | 1 122 694 A2 | 8/2001 |
| EP | 1 512 628 A1 | 3/2005 |

* cited by examiner

*Primary Examiner* — Brent Swarthout
(74) *Attorney, Agent, or Firm* — Oblon, Spivak, McClelland, Maier & Neustadt, L.L.P.

(57) ABSTRACT

A method of characterizing and counting violations of a threshold by an operating parameter of an aircraft engine of an aircraft includes detecting, by the aircraft, a violation of the threshold by the operating parameter while the aircraft engine is in operation. The method also includes, on detecting the violation, automatically transmitting from the aircraft to a ground system a warning message about the violation. Further, the method includes, on the basis of the warning message, automatically determining a severity level for the violation. In addition, the method includes incrementing a counter representing a number of occasions the operating parameter of the aircraft engine has presented a violation corresponding to the severity level.

11 Claims, 2 Drawing Sheets

METHOD AND A SYSTEM FOR CHARACTERIZING AND COUNTING VIOLATIONS OF A THRESHOLD BY AN AIRCRAFT ENGINE OPERATING PARAMETER

BACKGROUND OF THE INVENTION

The invention relates to monitoring aircraft engines, and more particularly gas turbine aircraft engines.

Systems already exist that enable parameters representative of the performance of an engine of an aircraft in flight to be collected at various instants. By way of example, these parameters comprise fuel consumption, speed of rotation of the high pressure spool, etc. These parameters are subsequently transmitted, to apparatus on the ground for analyzing them, e.g. via a satellite link or a very high frequency (VHF) link.

The analyses performed on the ground are relatively complex, in particular because of the large number of data parameters that are collected and that need to be processed. Furthermore, they often require intervention of at least one person, thereby making them vulnerable to human errors involving input, interpretation, etc.

OBJECT OF THE INVENTION

Consequently, there exists a method (and a system) that is simple and reliable and that serves to make use of data obtained in flight and representative of the operation of an aircraft engine, in particular for the purpose of facilitating engine maintenance.

BRIEF SUMMARY OF THE INVENTION

For this purpose and in a first aspect, the present invention proposes a method of characterizing and counting violations of a threshold by an operating parameter of an aircraft engine, the method comprising:
  a detection step of the aircraft detecting a violation of the threshold by the parameter while the engine is in operation;
  on detecting this violation, a transmission step of the aircraft automatically transmitting to a ground system a warning message about the violation;
  on the basis of this message, a step of automatically determining a severity level for the violation; and
  an incrementation step of incrementing a counter representing the number of occasions the operating parameter of the engine has presented a violation corresponding to this severity level.

The invention thus provides a simple method of monitoring an aircraft engine. The method serves to characterize the severity level of an observed violation of a (warning) threshold by a parameter, in particular for the purpose of counting the number of detected violations that correspond to the severity level.

The method of the invention advantageously processes only warning messages that are associated with an engine operating parameter violating a threshold. As a result, the amount of data analyzed by the method of the invention is relatively limited.

An analysis of the counter values as obtained in this way for various different severity levels can make it possible for the operator of the aircraft subsequently to adapt the maintenance operations that are to be performed on the engine.

Furthermore, the method is entirely automatic. Risks of errors of interpretation or of counting are thereby avoided, thus providing an engine monitoring method that is reliable and robust.

The method of the invention can be applied to characterizing and counting threshold violations by various operating parameters of an engine.

In particular, the method of the invention applies in preferred but non-limiting manner to monitoring the temperature of the gas exhausted from the combustion chamber of the aircraft engine, commonly referred to as exhaust gas temperature (EGT). This parameter is most important since it determines the potential lifetime of an aircraft engine in operation.

In a particular implementation of the invention, the warning message transmitted to the ground system is associated with a flight stage of the aircraft and includes at least one value taken by the operating parameter during the violation, together with the duration of the violation.

In the meaning of the invention, the value taken by the operating parameter during the violation that is contained in the warning message may be of various kinds. Thus, for example, it may be the maximum value of the temperature as measured over the duration of the violation.

In a variant, it could be a mean value of the temperatures measured during the violation.

In a particular implementation of the invention, the severity level of the violation is determined, from amongst a plurality of predefined severity levels, on the basis of the value taken by the parameter during the violation and of the duration of the violation, as contained in the warning message sent to the ground system.

In another implementation of the invention, during the step of automatically determining the severity level of the violation:
  a diagram is selected corresponding to the engine and to the flight stage of the aircraft and associated with the violating operating parameter, said diagram representing a plurality of geometrical severity zones as a function of the values taken by the parameter and of the duration for which the parameter took said values, each geometrical severity zone corresponding to a distinct severity level; and
  identifying on the diagram which severity zone contains the point of coordinates given by the value and the duration contained in the warning message.

In a second aspect, the invention also provides a system for characterizing and counting violations of a threshold by an operating parameter of an aircraft engine on the basis of at least one warning message about such a violation as transmitted automatically by the aircraft, the system comprising:
  means for acting on reception of the warning message to determine automatically a severity level for the violation; and
  means for incrementing a counter representative of the number of times the operating parameter of the engine has presented a violation corresponding to the severity level.

In a particular embodiment of the invention, the means for automatically determining the severity level of the violation comprise:
  means for selecting a diagram corresponding to the engine and to the flight stage of the aircraft, and associated with the operating parameter in violation, said diagram representing a plurality of geometrical severity zones as a function of values taken by the parameter and of the durations during which the parameter takes said value, each geometrical severity zone corresponding to a distinct severity level; and means for identifying on the diagram which severity zone contains the point of coordinates given by the value and the duration contained in the warning message for the parameter in violation.

BRIEF DESCRIPTION OF THE DRAWINGS

Other characteristics and advantages of the present invention appear from the following description made with reference to the accompanying drawings that show an implementation having no limiting character. In the figures.

DETAILED DESCRIPTION OF AN IMPLEMENTATION

The example described below relates to characterizing and counting violations of a threshold by an operating parameter of a gas turbine engine fitted to an airplane. Nevertheless, the invention is applicable to other types of aircraft, such as a helicopter, etc.

The operating parameter considered in this example is the temperature of the exhaust gas leaving the combustion chamber of the engine (referred to below as "EGT" for exhaust gas temperature). Nevertheless, this example is not limiting in any way. The invention may be applied to characterizing and counting violations of a threshold by other parameters, such as for example an oil pressure.

Figure 1:
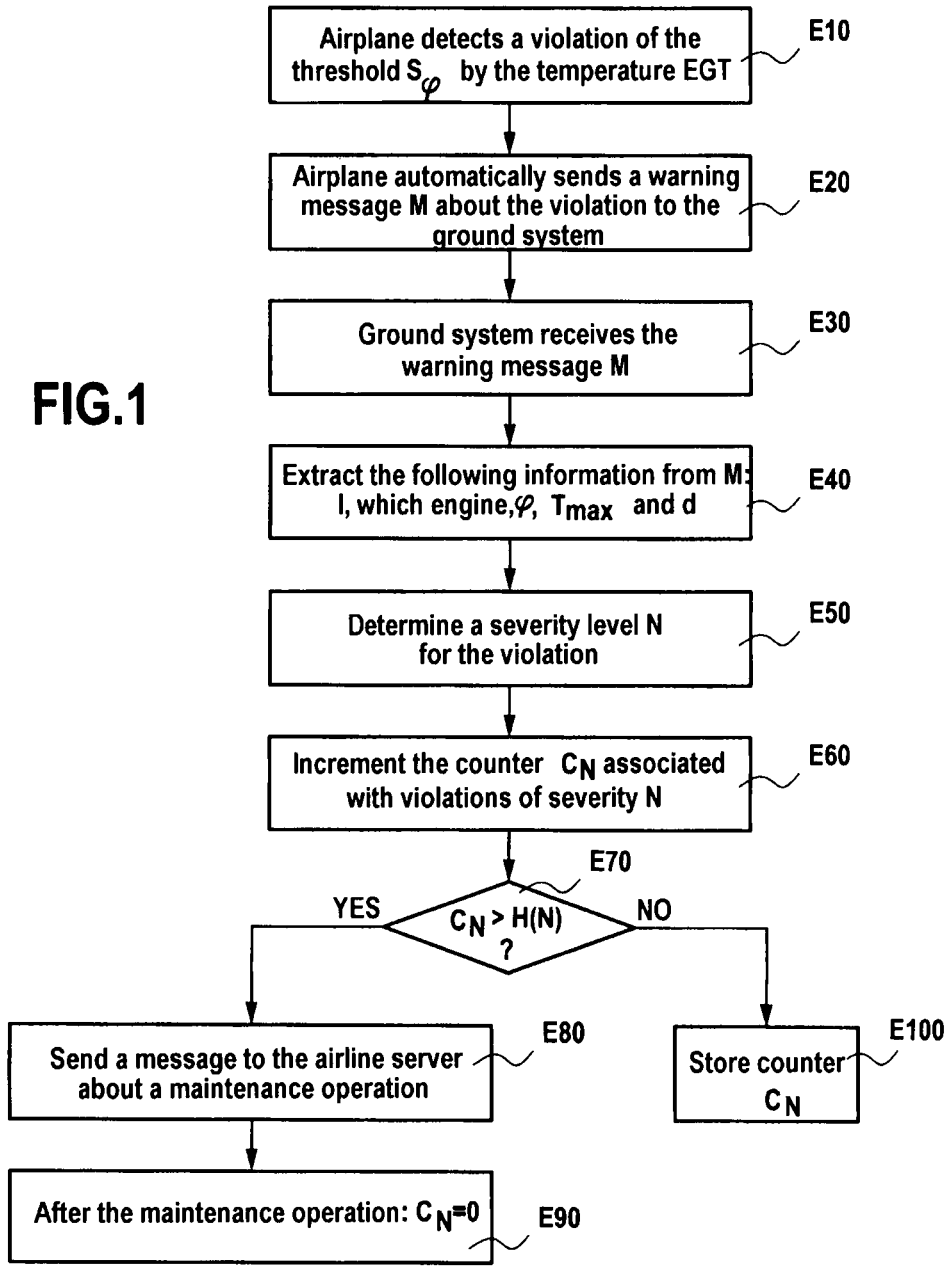
FIG. 1 is a flow chart showing the main steps of a method in accordance with the invention for characterizing and counting threshold violations by an operating parameter of an aircraft engine, in one particular implementation.

Reference is made initially to FIG. 1 which shows the main steps E10 to E100 of a particular implementation of the method of the invention. In this figure, steps E10 and E20 are implemented by appropriate means fitted to the airplane, while steps E30 to E100 are performed by a ground-based system for characterizing and counting threshold violations by an operating parameter of an aircraft engine in accordance with the invention (referred to below as the "ground system").

In a first step of the method (step E10), violation of a warning threshold by the EGT of the engine is detected by the airplane during a flight stage $\phi$.

In order to detect such a violation, the EGT is initially measured by means of sensors located in the airplane engine. Such sensors are well known in themselves and serve to measure the EGT either continuously or periodically.

The measurement obtained in this way is then stored and analyzed by analysis software that includes a comparator, and that is adapted to compare the measurement in real time with a warning threshold $S_\phi$. When a violation of the threshold $S_\phi$ is detected, the analysis software also serves to determine the duration d of the violation and also the maximum value $T_{max}$ reached by the EGT during the violation.

In the example described, the threshold $S_\phi$ corresponds to a threshold representative of operation of the engine that is assumed to be abnormal. In practice, the threshold $S_\phi$ varies as a function of the flight stage $\phi$ of the airplane, each flight stage $\phi$ being associated with an operating speed for the engine (e.g.: "nominal speed", "full throttle", or "slow"). Thus, and in particular, the threshold $S_\phi$ taken into consideration is higher when the airplane is taking off ("full throttle") than once it has reached its cruising speed ("nominal speed").

On detecting that the EGT of the engine has violated the threshold $S_\phi$, the airplane automatically sends a warning message M to the ground system (step E20).

For this purpose, the airplane is fitted with a transmission system that enables it to send information to the ground system in real time. The transmission system may be constituted for example by an aircraft communications addressing and reporting system (ACARS) making use of high frequency (HF), VHF or satellite connections. In known manner, the messages transmitted via the ACARS are received by a ground station adapted to receive such messages (receiver equipped with an appropriate antenna and decoder) and to send them to the ground system.

In the example described, the warning message M sent by the airplane to the ground system comprises at least the following information:

the identity I of the airplane;

the position of the engine (e.g. "left wing" or "right wing") for which the EGT parameter is in violation;

the flight stage $\phi$;

the maximum temperature value $T_{max}$ reached during the violation (e.g.: $T_{max}$=970° C.); and the duration d of the violation (e.g. d=4 min).

This warning message M is received during a step E30 by the ground system. The ground system is a data processor system constituted by one or more computers, and for this purpose it comprises at least a random access memory (RAM), a read-only memory (ROM), a processor, and communications means (e.g. a network interface card) for communicating over a telecommunications network (e.g. Internet) with other devices connected to the network.

The ground system then extracts the information $\phi$, $T_{max}$, d, I from the message M together with the position of the engine presenting an anomaly (step E40). The extraction of this information, and the subsequent processing performed on the basis of this information can be performed immediately the message M is received, or in a variant subsequently, after some predetermined number of warning messages have been received or at the end of the flight.

The identity I of the airplane and the position of the engine as extracted from the message M enable a reference R to be obtained for the engine presenting an anomaly (e.g. the serial number of the engine). For this purpose, the ground system makes use of a fleet management tool known to the person skilled in the art, in which each engine of the airplane of identity I (engine identified by its position in the management tool) is associated with the engine's serial number.

The information R, $\phi$, $T_{max}$, and d is then used in automatic manner to determine a severity level N for the violation indicated in the message M (step E50).

In the example described, for this purpose, use is made of a severity diagram of the engine associated with the EGT. Such a diagram, known to the person skilled in the art, is generally delivered with the engine. It depends on the flight stage and on the type of engine under consideration.

Figure 2:
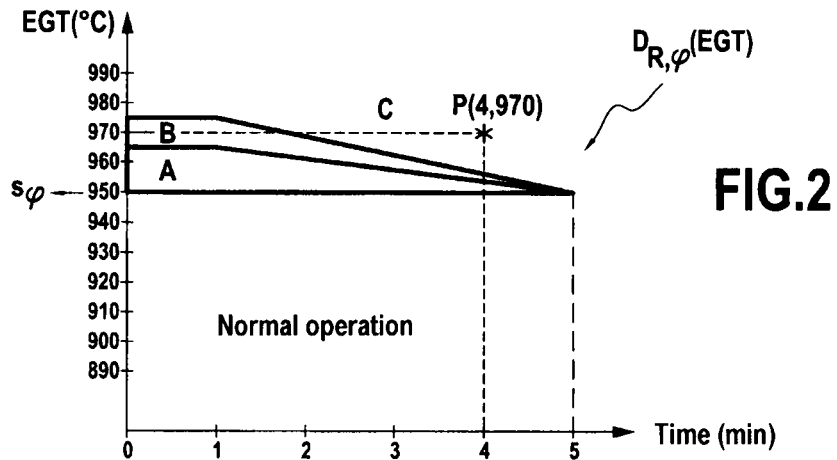
FIG. 2 is a severity diagram suitable for use in determining the level of severity of an observed violation by the EGT parameter.

An example of a severity diagram associated with the EGT of an engine is shown in FIG. 2.

In this diagram, there can be seen the warning threshold $S_{100}$ and a plurality of geometrical severity zones A, B, and C that are defined relative to the threshold $S_\phi$ and that are shown as a function of the values taken by the EGT and of the durations during which the EGT has those values.

The geometrical severity zones represent severity levels for the EGT violations encountered by the engine. Each severity zone is associated with a distinct severity level. For example, in FIG. 2:

- a violation corresponding to a maximum temperature $T_{max}^1 = 960°$ C. and to a duration $d^1 = 1$ min, and belonging to the geometrical zone A, is associated with a severity level NA (e.g. NA="abnormal");
- a violation corresponding to a maximum value $T_{max}^2 = 970°$ C. and to a duration $d^2 = 1$ min, and belonging to the geometrical zone B, is associated with a severity level NB (e.g. NB="deterioration"); and
- a violation corresponding to a maximum value $T_{max}^3 = 970°$ C. and to a duration $d^3 = 4$ min, and belonging to the geometrical zone C is associated with a severity level NC (e.g. NC="overtemperature").

Thus, during step E50 of determining the severity level, use is made of the reference R of the airplane engine and of the flight stage $\phi$ contained in message M to begin by selecting a severity diagram $D_{R,\phi}(\mathrm{EGT})$ that is associated with the EGT. For this purpose, a database of severity diagrams associated with EGT is interrogated on the basis of the parameters R and $\phi$ using database interrogation means known to the person skilled in the art. By way of example, the severity diagram may be stored in a read-only memory database of the ground system, or it may be obtained by interrogating a remote server.

Thereafter, the severity level N of the violation indicated in the warning message M is determined automatically and with the help of the diagram $D_{R,\phi}(\mathrm{EGT})$. During steps E501 to E504 shown in FIG. 3 and described below, this is done by identifying which severity zone (A, B, or C) of the diagram $D_{R,\phi}(\mathrm{EGT})$ contains the point P of coordinates given respectively by the duration d and the maximum temperature $T_{max}$ contained in the warning message M. Using the zone as identified in this way, the associated severity level N is deduced therefrom. In the example of FIG. 2, the point P having coordinates (x=4, y=970) lies in the severity zone C that is associated with the severity level NC.

With the severity level N determined in this way, a counter $C_N$ representative of the number of times the EGT of the engine has violated the threshold $S_\phi$ corresponding to the severity level N is incremented by 1 (step E60). Thus, in the example of FIG. 2, the counter $C_{NC}$ associated with the severity zone C is incremented by 1.

In the implementation described, the value of the count $C_N$ is then compared with a predetermined threshold H(N) associated with the severity level N (step E70). The threshold H(N) defines the number of violations of severity N that are authorized for the EGT before the engine must be subjected to a maintenance operation. This maintenance operation may depend in particular on the severity level N.

In a variant, the threshold H(N) is the same for all of the severity levels.

If the value of the count $C_N$ is greater than the threshold H(N), then a message is sent by the ground system to a server of an operator of the airplane (e.g. an airline) in order to indicate that the threshold H(N) has been exceeded by the count $C_N$ (step E80). By way of example, this message is sent by the communications means of the ground system via Internet.

On receiving the message, a maintenance operation on the engine of the airplane is ordered by the operator of the airplane. Following this operation, the count $C_N$ is reinitialized to zero by the ground system.

If during step E70 it is found that the count $C_N$ is less than or equal to the threshold H(N), then the ground system stores the value of the count $C_N$ (step E100) and waits for a new warning message.

In another embodiment of the invention, the ground system may also periodically send to the operator of the airplane the count values associated with each engine of the airplane. This enables the airplane operator to receive a periodic report about the state of the airplane.

Figure 3:
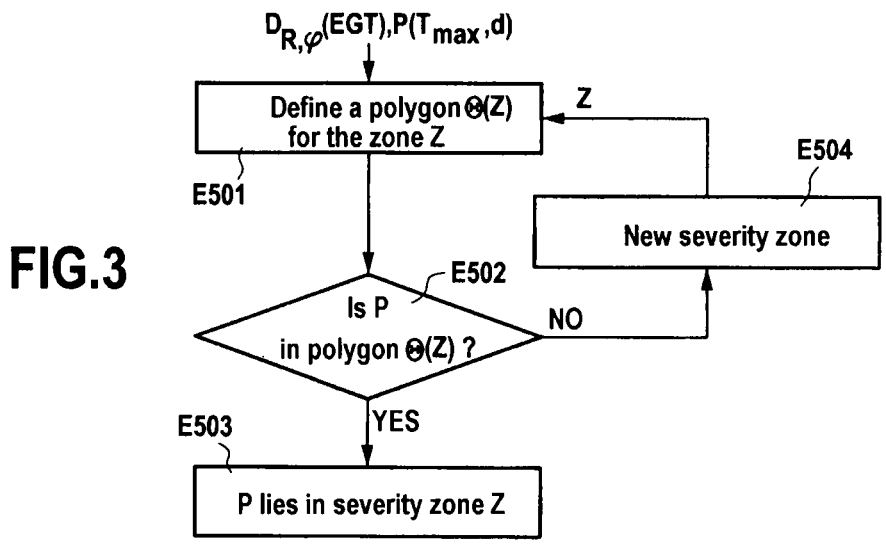
FIG. 3 is a flow chart showing the main steps that can be implemented to identify the severity zone in which a point P lies on a severity diagram, in a particular implementation of the invention.
Figure 4:
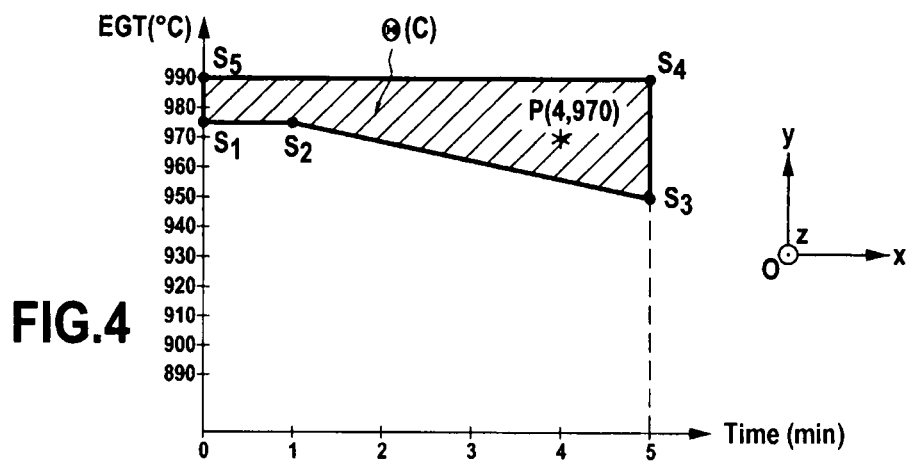
FIG. 4 shows an example of a connected polygon $\Theta(C)$ that is associated with the severity zone C that might be taken into consideration during the step of determining the severity level of a violation in a particular implementation of the method of the invention.

With reference to FIGS. 3 and 4, there follows a description of a succession of steps E501 to E504 that can be implemented for determining which severity zone contains the point P.

In a variant, it is possible to use other methods that serve to identify a geographical zone (or an area) in which a point lies.

The steps E501 to E504 described below are performed for each severity zone Z of the diagram (Z=A, B or C in this example), until the severity zone in which the point P lies has been identified.

For the severity zone Z under consideration, a connected polygon $\Theta(Z)$ is initially defined (step E501). The polygon $\Theta(Z)$ has Q vertices $S_i$, i=1, . . . , Q.

The polygon $\Theta(Z)$ is constituted by the severity zone Z when the zone is closed (e.g. zones A and B in FIG. 2). When the severity zone Z is not closed (e.g. zone C), then the polygon $\Theta(Z)$ may be defined from a severity zone Z that is closed by the limit values of the axes of the diagram (for the zone C shown in FIG. 2, these limit values correspond to time=5 min and EGT=990° C.)

An example of a polygon $\Theta(Z=C)$ for the severity zone C is shaded in FIG. 4.

Thereafter, it is determined whether the point P lies in the polygon $\Theta(Z)$ as defined in this way (step E502).

To do this:

a) The set E of indices i, i=1, . . . , Q for the vertices $S_i$ of the polygon $\Theta(Z)$ is identified that satisfies the following two conditions:

$$0 < \overrightarrow{S_i P} \cdot \overrightarrow{S_i S_{i+1}} \le \|\overrightarrow{S_i S_{i+1}}\|^2 \qquad (1)$$

$$z(\overrightarrow{PS_i} \wedge \overrightarrow{PS_{i+1}}) < 0 \qquad (2)$$

in a rectangular frame of reference (Oxyz) oriented in the counterclockwise (or trigonometrical direction). In this frame of reference, the axes (Ox) and (Qy) are defined by the axes of the diagram, and the axis (Oz) is orthogonal to the plane of the diagram, as shown in FIG. 4.

The symbols "•" and "∧" designate respectively the scalar product and the vector product of two vectors. The notation z($\vec{u}$) designates the component of the vector $\vec{u}$ along the axis (Oz). The vertices $S_i$ and $S_{i+1}$ are adjacent vertices, numbered in the counterclockwise direction (cf. FIG. 4).

b) Thereafter, it is determined whether for at least one index j of the set E there exists an index k such that the triangles $PS_jS_{j+1}$, $PS_{j+1}S_k$, and $PS_kS_j$ are direct triangles.

c) Where applicable, the point P lies in the polygon $\Theta(z)$.

If during step E502 c), it is determined that the point P does not lie in the polygon $\Theta(Z)$, then steps E501 and E502 are repeated for a new severity zone (determined in step E504)

until the severity zone containing the point P is identified (or equivalently, until the polygon in which the point P lies has been identified).

Naturally, for a severity diagram having L severity zones, if during the L-1 successive steps E502 it is determined that the point P does not belong any of the zones tested, then there is no need to test the last zone (since the point must necessarily belong thereto, by deduction).

What is claimed is:

1. A method of characterizing and counting violations of a threshold by an operating parameter of an aircraft engine of an aircraft, said method comprising:
   detecting, by the aircraft, a violation of the threshold by the operating parameter while said aircraft engine is in operation;
   on detecting the violation, automatically transmitting from the aircraft to a ground system a warning message about the violation;
   on the basis of the warning message, automatically determining a severity level for the violation; and
   incrementing a counter representing a number of occasions the operating parameter of the aircraft engine has presented a violation corresponding to the severity level.

2. The method according to claim 1, wherein the warning message transmitted to the ground system is associated with a flight stage of the aircraft and includes at least one value taken by the operating parameter during the violation and the duration of the violation.

3. The method according to claim 2, wherein the severity level of the violation is determined, from amongst a plurality of predefined severity levels, on the basis of the at least one value taken by the operating parameter during the violation and of the duration of the violation, as contained in the warning message.

4. The method according to claim 2, wherein said automatically determining the severity level for the violation includes
   selecting a diagram corresponding to the aircraft engine and to the flight stage of the aircraft and associated with the operating parameter, said diagram representing a plurality of geometrical severity zones as a function of values taken by the operating parameter and of a duration for which the operating parameter took said values, each geometrical severity zone corresponding to a distinct severity level; and
   identifying on the diagram which severity zone contains a point of coordinates given by the at least one value and the duration contained in the warning message.

5. The method according to claim 1, wherein the operating parameter is a temperature of a gas exhausted from a combustion chamber of the aircraft engine.

6. A system for characterizing and counting violations of a threshold by an operating parameter of an engine of an aircraft on the basis of at least one warning message about such a violation as transmitted automatically by the aircraft, the system comprising:
   a sensor for sensing when an operating parameter violates a threshold; a transmitter for automatically transmitting at least one warning message to a ground based system when the operating parameter violates the threshold; a determining unit located at the ground based system configured to act on a reception of the at least one warning message to determine automatically a severity level for the violation; and
   an incrementing unit configured to increment a counter representative of a number of times the operating parameter of the aircraft engine has presented a violation corresponding to the severity level.

7. The system according to claim 6, wherein the at least one warning message is associated with a flight stage of the aircraft and includes at least a value taken by the operating parameter in the violation and the duration of the violation.

8. The system according to claim 7, wherein the severity level of the violation is determined, from amongst a plurality of predefined severity levels, on the basis of the value taken by the operating parameter during the violation and of the duration of the violation, as contained in the at least one warning message.

9. The system according to claim 7, wherein the determining unit includes:
   a selection unit configured to select a diagram corresponding to the aircraft engine and to the flight stage of the aircraft, and associated with the operating parameter in violation, said diagram representing a plurality of geometrical severity zones as a function of values taken by the operating parameter and of durations during which the operating parameter takes said values, each geometrical severity zone corresponding to a distinct severity level; and
   an identification unit configured to identify on the diagram which severity zone contains a point of coordinates given by the value and the duration contained in the at least one warning message for the operating parameter in violation.

10. The system according to claim 6, wherein the operating parameter is a temperature of an exhaust gas at an outlet from a combustion chamber of the aircraft engine.

11. The method according to claim 4, wherein the identifying includes identifying a set of indices i, i=1, . . . ,Q for vertices $S_i$ of a polygon $\Theta(Z)$ that satisfies the following two conditions:

$$0 < \overrightarrow{S_iP} \cdot \overrightarrow{S_iS_{i+1}} < \|\overrightarrow{S_iS_{i+1}}\|^2 \qquad (1)$$

$$z(\overrightarrow{PS_i} \wedge \overrightarrow{PS_{i+1}}) > 0 \qquad (2)$$

in a rectangular frame of reference (Oxyz) oriented in a counterclockwise direction, wherein axes (Ox) and (Oy) are defined by axes of the diagram, axis (Oz) is orthogonal to a plane of the diagram, the symbols "•" and "∧" designate, respectively, a scalar product and a vector product of two vectors, the notation $z(\vec{u})$ designates a component of a vector $\vec{u}$ along the axis (Oz), and the vertices $S_i$ and $S_{i+1}$ are adjacent vertices, numbered in the counterclockwise direction, and
   determining whether for at least one index of the set of indices there exists an index such that the triangles $PS_jS_{j+1}$, $PS_{j+1}S_k$, and $PS_kS_j$ are direct triangles, wherein P is the point of coordinates.

* * * * *